United States Patent [19]

Tyan et al.

[11] Patent Number: 4,904,577

[45] Date of Patent: Feb. 27, 1990

[54] OPTICAL RECORDING ELEMENT AND ALLOY FOR USE THEREIN

[76] Inventors: Yuan-Sheng Tyan; Pranab K. Raychaudhuri; Fridrich Vazan, all of Kodak Park Division, Rochester, N.Y. 14650

[21] Appl. No.: 273,790

[22] Filed: Nov. 21, 1988

[51] Int. Cl.[4] .................. C22C 30/00; C22C 12/00
[52] U.S. Cl. .................. 430/495; 420/576; 420/589
[58] Field of Search ............... 420/589, 576; 430/495

[56] References Cited

U.S. PATENT DOCUMENTS

| | | | |
|---|---|---|---|
| 4,774,170 | 9/1988 | Pan et al. | 430/495 |
| 4,795,695 | 1/1989 | Pan et al. | 430/495 |
| 4,798,785 | 1/1989 | Pan et al. | 430/495 |
| 4,812,385 | 3/1989 | Pan et al. | 430/495 |
| 4,812,386 | 3/1989 | Pan et al. | 430/495 |
| 4,816,385 | 3/1989 | Gravesteijn et al. | 430/495 |
| 4,818,666 | 4/1989 | Gravesteijn et al. | 430/495 |

FOREIGN PATENT DOCUMENTS

| | | |
|---|---|---|
| 0278789 | 8/1988 | European Pat. Off. . |
| 49-72158 | 7/1974 | Japan . |
| 59-31458 | 2/1984 | Japan . |
| 63-206922 | 8/1988 | Japan . |
| 63-234420 | 9/1988 | Japan . |

*Primary Examiner*—John P. Sheehan
*Assistant Examiner*—David W. Schumaker

[57] ABSTRACT

There is disclosed an antimony, tin and indium alloy which contains an additional element. The additional element is selected from the group consisting of titanium, aluminum, magnesium, manganese, silver, bismuth, germanium, lead, tellurium, gold, zinc, copper, palladium, nickel, iron, cobalt, and cadmium. The additional element substantially reduces arcing during the sputtering process used to make optical recording layers from the alloy.

5 Claims, No Drawings

OPTICAL RECORDING ELEMENT AND ALLOY FOR USE THEREIN

FIELD OF THE INVENTION

This invention relates to alloys that are useful in optical recording.

BACKGROUND OF THE INVENTION

Thin film optical recording layers using chalcogenide thin-films and amorphous to crystalline phase transitions have been the subject of many investigations since the early 1970's. The initial interests were focused on "erasable", and therefore reusable, optical recording layers since the amorphous to crystalline transition is, in principle, a reversible process. A low power, relatively long duration laser pulse is used to heat a local spot on the layer to below the melting point for a sufficient length of time to cause the spots to crystallize. These crystalline spots can in turn be heated, by a higher power, shorter duration laser, above the melting point of the crystallized spots to randomize the structure of the spots. The layer is designed such that upon the termination of the laser pulse, the cooling rate of the heated spot is high enough that the randomized structure is frozen to achieve an amorphous state.

Thus by adjusting the laser power and duration, the state of a selected area on the layer can be switched between the amorphous state and the crystalline state to create a pattern of amorphous and crystalline spots which can be used for information storage. Since the phase transition is reversible, the pattern can be erased and replaced with a different recorded pattern. Theoretically, this erase-write cycle can be carried out any number of times.

Very few materials are known for optical recording layers in which the above described write-erase-write cycle is of practical use. No erasable phase-change type optical recording layers have been commercialized.

A good deal of attention has also focused on so-called "write-once" thin film optical recording layers. Write-once simply means that the layers can be recorded upon only once. Such layers cannot be erased and reused for a subsequent recording.

European Patent Application No. 0184452 discloses certain erasable optical recording layers of antimony-indium and antimony-indium-tin alloys. Information recording and erasure are said to be achieved by switching the layers between two diferent crystalline states. The layers are generally prepared in the amorphous states which have to be first converted into one of the two crystalline states before information can be recorded. The crystallization state, achieved by either a bulk heat-treatment or a prolonged laser exposure, is said to have a lower reflectance than the amorphous state. The examples indicate that the materials disclosed therein have a very slow rate of crystallization. This application further teaches that the optical recording layers disclosed therein are unsuitable for use in the amorphous-to-crystalline transition mechanism because of the instability of the amorphous state in general.

The problem is that the prior art has not provided write-once optical recording layers which possess the combination of (a) a crystallization rate less than 1.0 $\mu$s, (b) good corrosion resistance, (c) a stable amorphous state and (d) a capability of high rate, high density recordings.

This problem is solved in copending U.S. Ser. No. 194,605 filed May 16, 1988 which is a continuation-in-part of U.S. Ser. No. 014,336 filed Feb. 13, 1987. In that application there is disclosed an alloy of antimony, tin and indium, which alloy is capable of high performance write-once optical recording. The elements of this application do not suffer the environmental corrosion see in chalcogen rich thin films. The rate of crystallization of the optical recording layers is less than 1 $\mu$s using practical laser power. The dynamic recording sensitivity at 10 m/s is up to about 6.5 mW, particularly in the range of 3.5 to 6.5 mW. The amorphous state is very stable. Thus, recordings on the thin film are made using the amorphous to crystalline transition mechanism. The layers are capable of high density, high rate recordings having a dynamic carrier-to-noise ratio (CNR) over 60 decibels, particularly in the range of 60 to 65 decibels.

However, while antimony-tin-indium alloys have been found to be useful in erasable and write-once elements, depending on the specific composition of the alloy, a problem has been discovered in the manufacture of the optical recording layers using these alloys. The usual manufacturing process uses a sputtering process. A high voltage is placed between the source of the material to be coated (sometimes referred to as the target) and the substrate to be coated or some other element in the coating chamber. Material sputtered from the target is thus deposited on the substrate. The sputtering process is well know in the art and is described, for example, in: THIN FILM PROCESSES, edited by Vossen and Kern, Academic Press Inc. 1978.

We have found that when the target is an antimony-tin-indium alloy, electrical arcing sometimes occurs during the deposition process. This arcing causes many problems. If the arc terminates at the substrate to be coated, a very serious defect in the coating occurs. For example, the arc can cause localized crystallization of the amorphous layer and, in extreme cases, ablation of the forming layer and damage to the substrate. In any event, an arc disrupts the even flow of current from the power supply and the result is non-uniform coating. There is no suggestion of a solution to this problem in the art of which we are aware.

SUMMARY OF THE INVENTION

In accordance with the present invention, there is provided an improved antimony, tin and indium alloy for use in optical recording. The improvement is that the alloy includes at least one additional element selected from the group consisting of titanium, aluminum, magnesium, manganese, silver, bismuth, germanium, lead, tellurium, gold, zinc, copper, palladium, nickel, iron, cobalt, and cadmium, said additional element being present in an amount sufficient to reduce arcing during the sputtering of said alloy.

In another embodiment, there is provided an improved optical recording element comprising a support having thereon an optical recording layer comprising the described alloy.

The additional element in the alloy substantially reduces, and in many cases effectively eliminates arcing during the sputtering of the alloy. While not wishing to be bound by any particular theory, it appears that the additional element in the alloy results in a finer grain structure in the melt cast target that is used in the sputtering process. With finer grain, it appears that the target is more uniform and therefore less prone to arcing.

DETAILED DESCRIPTION OF THE INVENTION

In accordance with the invention, the antimony-tin-indium alloy contains at least one additional element. As noted, that element is selected from the group consisting of titanium, aluminum, magnesium, manganese, silver, bismuth, germanium, lead, tellurium, gold, zinc, copper, palladium, nickel, iron, cobalt, and cadmium. Mixtures of these elements are also useful.

As will be appreciated from the broad definition of the additional element that can be used according to the invention, the particular element chosen is not particularly critical. This is because the apparent function of the additional element is to prevent the formation of large crystals during the formation of the melt-cast target. The addition of almost any "impurity" element or elements appears to accomplish this function.

It was particularly surprising that an additional element could be added to the antimony-tin-indium alloy and still retain the desirable properties that make these alloys useful for optical recording.

The preferred additional elements are titanium, aluminum, magnesium, manganese, silver, bismuth, germanium, lead, tellurium, gold, zinc and copper. In particularly preferred embodiments, the element is selected from the group consisting of aluminum, magnesium, manganese, silver and bismuth. These alloys can be sputtered with virtually no arcs.

Also in preferred embodiments, the additional element is present in an amount less than 10% by weight and still more preferably less than 5% by weight of the alloy.

The exact amount of a particular element can be determined by simple trial and error. If a proposed composition exhibits fewer arcs per minute than the corresponding binary alloy, during sputtering, the amount is considered to be sufficient to reduce arcing in accordance with the invemtion.

The basic antimony-tin-indium alloy to which the additional element is added can be any of those known in the art for optical recording. This includes the erasable alloys used disclosed in the above-mentioned European Patent Application No. 0 184 452 and write-once alloys described in the copending commonly assigned U.S. Ser. No. 194,605 also mentioned above.

Optical recording layers can be prepared by conventional thin film deposition techniques such as RF (radio frequency) and DC (direct current) sputtering from an alloy target using the alloys of the invention. Enhancement of sputtering processes by applying magnetic fields (magnetron sputtering) can also be used. The thickness of the films can be from a few tens to a few hundreds nano-meters depending on compromises among factors such as contrast, sensitivity, production rate, material cost, ease of control, data rate, etc.

Supports which can be used include plastic films, such as polyethylene terephthalate, polymethyl methacrylate, and polycarbonate, a glass plate, paper, plastic and metallic plates.

Recording information on the thin film layers made using the alloy of the invention is achieved by focusing an information modulated laser bean on the layer thereby forming a pattern of information on the layer.

A useful element comprises a thin film optical recording layer coated on a substrate. A double sided structure can be formed by laminating two such coated substrates together. In response to a drive signal, the intensity of a diode recording beam focused on the recording layer is modulated in accordance with information to be recorded.

In a preferred element there is provided, in order, (i) a substrate, (ii) a surface smoothing layer, (iii) a reflecting layer, (iv) said optical recording layer, and (v) a protective overcoat layer.

During recording, the element is spun at a constant rate, e.g., 1800 rotations per minute (rpm). As a result, a track of information is recorded on the optical recording layer in the form of selected crystallized areas. As recording continues, the recording spot is caused to scan radially inward across the element, thereby causing information to be recorded along a spiral or concentric track. The sizes and spacings of the recorded information marks vary in accordance with the information content of the recording laser drive signal, as well as with radial position on the element.

During the readback process, the thus recorded information bearing element is spun at the same rate as it was spun during the recording process. The optical path of a readout laser beam is focused to a playback spot on the element by a high numerical aperture lens. The element is of the reflective type so that the radiation forming the playback spot is reflected back through the high numerical aperture lens after interacting with the information marks recorded on the optical element. A lens directs reflected laser radiation onto a detector which produces an electrical playback signal in response to temporal variations (contrast) in the irradiance of the reflected laser radiation falling on the detector.

For some of the examples below, the performance of the alloys of the invention in optical recording layers was confirmed using a dynamic tester. The suitability of the recording layer for optical recording is determined by measuring the change in reflection between the exposed and unexposed areas of the sample, i.e., between the crystalline and amorphous states. For the alloys tested, there was no detectable degradation of the optical recording performance.

The following examples are presented for a further understanding of the invention:

EXAMPLE 1

This is a comparative example.

A two-inch diameter melt-cast alloy target was fabricating with a composition of $Sb_{0.6}In_{0.16}Sn_{0.24}$. This target was used for thin-film preparation using a commercially available planar magnetron sputtering machine purchased from Ion Tech Limited. The atmosphere in the sputtering chamber was argon and the pressure was 3 mTorr. The sputtering power was 50 watts.

During the sputtering process, 5 arcs per minute were observed.

EXAMPLES 2-14

Example 1 was repeated except that an additional element was added to the melt cast alloy target, in addition to the antimony, tin and indium.

Table I shows the results of the sputtering:

TABLE I

| Ex. | Element | % By Weight | Arcs/Min |
|---|---|---|---|
| 2 | titanium | 1.4 | 1 |
| 3 | aluminum | 2.6 | 0 |
| 4 | aluminum | 1.2 | 0 |
| 5 | magnesium | 2.6 | 0 |

TABLE I-continued

| Ex. | Element | % By Weight | Arcs/Min |
|---|---|---|---|
| 6 | manganese | 3.1 | 0 |
| 7 | silver | 3.0 | 0 |
| 8 | bismuth | 4.2 | 0 |
| 9 | germanium | 2.2 | 2 |
| 10 | lead | 4.8 | 1 |
| 11 | tellurium | 4.7 | 1 |
| 12 | gold | 3.5 | 2 |
| 13 | zinc | 4.4 | 1 |
| 14 | copper | 3.6 | 0* |

*On long term storage, the stability of the copper alloy was less than the other alloys.

The invention has been described in detail with particular reference to preferred embodiments thereof, but it will be understood that variations and modifications can be effected within the spirit and scope of the invention.

We claim:

1. In an alloy of antimony, tin and indium for use in optical recording, the improvement wherein said alloy includes at least one additional element selected from the group consisting of titanium, aluminum, magnesium, manganese, silver, bismuth, germanium, lead, tellurium, gold, zinc, copper, palladium, nickel, iron, cobalt, and cadmium, said additinal element being present in an amount sufficient to reduce arcing during sputtering of said alloy.

2. An alloy according to claim 1 wherein said additional element is present in an amount less than 5%.

3. An alloy according to claim 1 wherein said additional element is selected from the group consisting of aluminum, magnesium, manganese, silver and bismuth.

4. In an optical recording element comprising a support having therein an optical recording layer comprising an alloy of antimony, tin and indium, the improvement wherein said alloy includes at least one additional element selected from the group consisting of titanium, aluminum, magnesium, manganese, silver, bismuth, germanium, lead, tellurium, gold, zinc, copper, palladium, nickel, iron, cobalt, and cadmium, said additional element being present in an amount sufficient to reduce arcing during sputtering of said alloy.

5. An optical recording element according to claim 4 comprising, in order, (i) a substrate, (ii) a surface smoothing layer, (iii) a reflecting layer, (iv) said optical recording layer, and (v) a protective overcoat layer.

* * * * *

UNITED STATES PATENT AND TRADEMARK OFFICE
CERTIFICATE OF CORRECTION

PATENT NO. : 4,904,577
DATED : February 27, 1990
INVENTOR(S) : Yuan-sheng Tyan et al It is certified that error appears in the above-identified patent and that said Letters Patent is hereby corrected as shown below:

ON TITLE PAGE:  Attorney, Agent or Firm has been omitted,

Should read

--Attorney, Agent or Firm: John R. Everett

Col. 6, line 2, the part reading

"said additinal element"

should read

--said additional element--

Signed and Sealed this

Fourteenth Day of January, 1992

Attest:

HARRY F. MANBECK, JR.

*Attesting Officer*     *Commissioner of Patents and Trademarks*